United States Patent [19]

Burk et al.

[11] 4,102,811

[45] Jul. 25, 1978

[54] CATALYST DEMETALLIZATION BY OXIDATION IN A DEFINED TEMPERATURE RANGE

[75] Inventors: Emmett H. Burk, Glenwood; Jin S. Yoo, South Holland; John A. Karch, Chicago; Jui-Yuan Sun, South Holland, all of Ill.

[73] Assignee: Atlantic Richfield Company, Philadelphia, Pa.

[21] Appl. No.: 695,687

[22] Filed: Jun. 14, 1976

[51] Int. Cl.² .................. C10G 11/18; B01J 8/24; B01J 29/38
[52] U.S. Cl. .................. 252/411 R; 208/52 CT; 208/120; 252/411 S; 252/413; 252/415; 252/416; 252/455 Z
[58] Field of Search ............... 252/411–416; 208/120

[56] References Cited

U.S. PATENT DOCUMENTS

| | | | |
|---|---|---|---|
| 3,122,497 | 2/1964 | Erickson | 208/120 |
| 3,123,548 | 3/1964 | Connor et al. | 208/305 X |
| 3,147,209 | 9/1964 | Erickson et al. | 252/416 X |
| 3,147,228 | 9/1964 | Erickson | 252/412 |
| 3,148,155 | 9/1964 | Schwartz | 252/413 |
| 3,150,103 | 9/1964 | Anderson | 252/412 |
| 3,168,459 | 2/1965 | Anderson et al. | 208/57 |
| 3,168,460 | 2/1965 | Lehman et al. | 208/67 |
| 3,234,145 | 2/1966 | Foster | 252/413 |
| 3,562,150 | 2/1971 | Hamilton et al. | 208/216 |

*Primary Examiner*—Delbert E. Gantz
*Assistant Examiner*—G. E. Schmitkons
*Attorney, Agent, or Firm*—Frank J. Uxa

[57] ABSTRACT

A process for the removal of metal poisons such as nickel, iron and/or vanadium from a hydrocarbon conversion catalyst which includes the steps of contacting a regenerated sulfided catalyst with an oxygen-containing gas in a defined temperature range of from about 525° F. to about 725° F. and washing at least a portion of the metal poisons from the catalyst. A preferred wash solution is a reductive wash medium comprising a saturated, aqueous solution of $SO_2$. The vanadium and nickel metals may be recovered from the resultant used wash solution for possible metallurgical use. The washed catalyst may also be subjected to subsequent oxidative washes such as a hydrogen peroxide wash prior to its return to the hydrocarbon conversion process.

16 Claims, 2 Drawing Figures

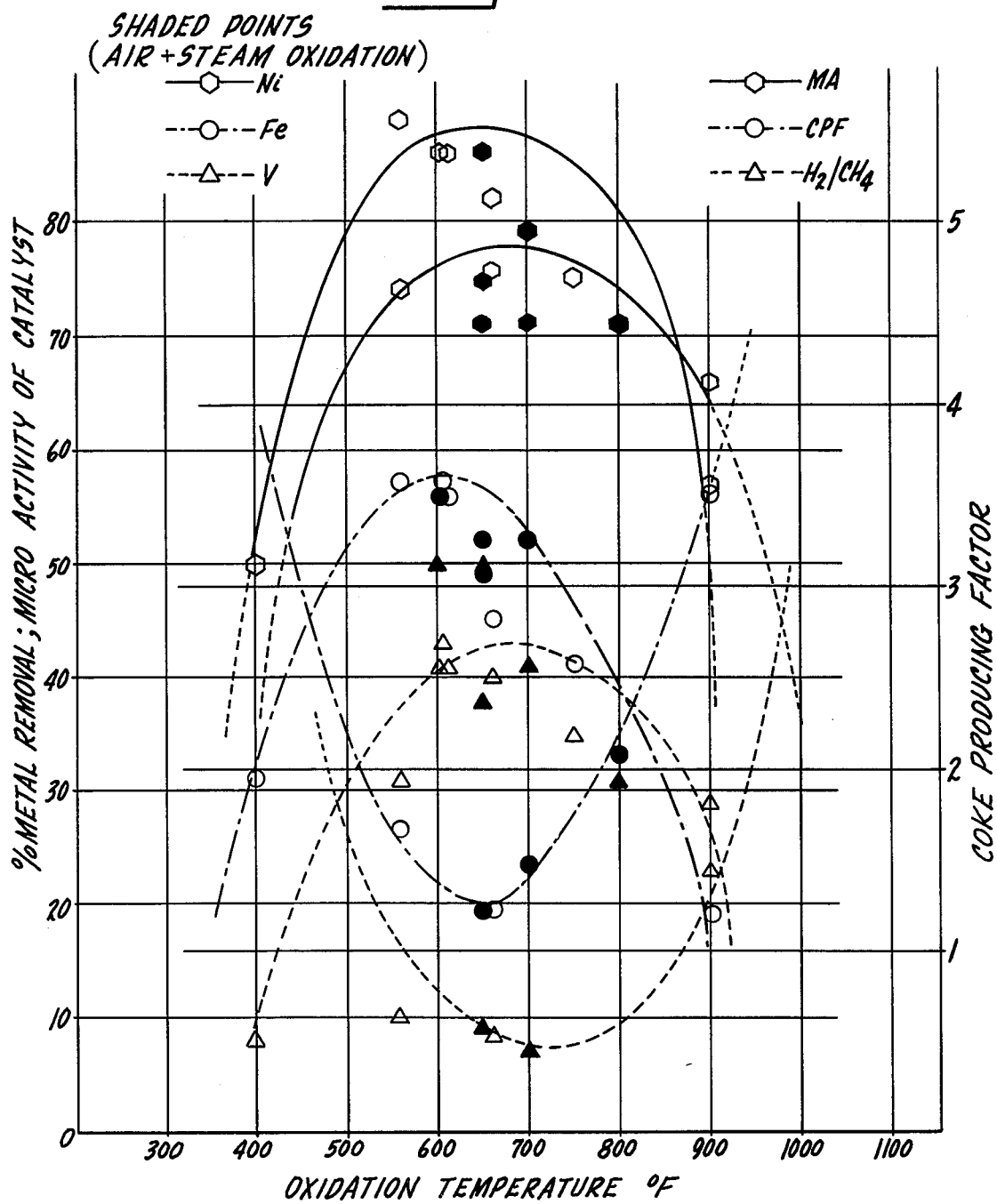

CATALYST DEMETALLIZATION BY OXIDATION IN A DEFINED TEMPERATURE RANGE

BACKGROUND OF THE INVENTION

This invention relates to a process for the removal of metal poisons from a hydrocarbon conversion catalyst which has been contaminated with one or more poisoning metals by use in a high temperature catalytic conversion of hydrocarbon feedstocks containing these metals to more valuable, lower boiling products. The invention may be used as part of an overall metalsremoval process employing a plurality of processing steps to remove a significant amount of one or more of nickel, vanadium and iron contained in the poisoned catalyst. This invention also relates to the recovery of valuable metals, particularly vanadium, from hydrocarbon feedstocks such as crude or reduced crude in a form suitable for metallurigical refining.

Catalytically promoted methods for the chemical conversion of hydrocarbons include cracking, hydrocracking, reforming, hydrodenitrogenation, hydrodesulfurization, etc. Such reactions generally are performed at elevated temperatures, for example, about 300° to 1200° F., more often 600° to 1000° F. Feedstocks to these processes comprise normally liquid and solid hydrocarbons which, at the temperature of the conversion reaction, are generally in the fluid, i.e., liquid or vapor state, and the products of the conversion usually are more valuable, lower boiling materials.

In particular, cracking of hydrocarbon feedstocks to produce hydrocarbons of preferred octane rating boiling in the gasoline range is widely practiced and uses a variety of solid oxide catalysts to give end products of fairly uniform composition. Cracking is ordinarily effected to produce gasoline as the most valuable product and is generally conducted at temperatures of about 750° to 1100° F., preferably about 850° to 950° F., at pressures up to about 2000 psig., preferably about atmospheric to 100 psig. and without substantial addition of free hydrogen to the system. In cracking, the feedstock is usually a petroleum hydrocarbon fraction such as straight run or recycle gas oils or other normally liquid hydrocarbons boiling above the gasoline range. Recently, low severity cracking conditions have been employed for heavily contaminated feedstocks such as crude or reduced crude where the conversion is not made directly to the most valuable, lower boiling products, i.e. gasoline boiling range products, but to intermediate type hydrocarbon conversion products which may be later refined to the more desirable, lower boiling, gasoline or fuel oil fractions. High severity cracking has also been practiced for the conversion of such feedstocks to light, normally gaseous hydrocarbons, such as ethane, propane or butane.

The present invention relates to the improvement of catalyst performance in hydrocarbon conversion where metal poisoning occurs. Although referred to as "metals", these catalyst contaminants may be present in the hydrocarbon feed in the form of free metals or relatively non-volatile metal compounds. It is, therefore, to be understood that the term "metal" as used herein refers to either form. Various petroleum stocks have been known to contain at least traces of many metals. For example, Middle Eastern crudes contain relatively high amounts of several metal components, while Venezuelan crudes are noteworthy for their vanadium content and are relatively low in other contaminating metals such as nickel. In addition to metals naturally present in petroleum stocks, including some iron, petroleum stocks also have a tendency to pick up tramp iron from transportation, storage and processing equipment. Most of these metals, when present in a stock, deposit in a relatively non-volatile form on the catalyst during the conversion processes so that regeneration of the catalyst to remove deposited coke does not also remove these contaminants. With the increased importance of gasoline in the world today and the shortages of crude oils and increased prices, it is becoming more and more important to process any type or portion of the crude, including the highly metal contaminated crudes to more valuable products.

Typical crudes which are contaminated with metals and some average amounts of metal are: North Slope, 11 ppm nickel, 33 ppm vanadium; Lagomedio (Venezuelan); 12 ppm nickel, 116 ppm vanadium; light Iranian, 16 ppm nickel, 44 ppm vanadium; heavy Iranian, 30 ppm nickel, 22 ppm vanadium. In general, a crude oil can contain from about 5 to 500 ppm nickel and from about 5 to 1500 ppm vanadium. Moreover, since the metals tend to remain behind during processing, the bottoms of typical feeds will have an amount of metals two, three, four times or more than the original crude. For example, reduced crude or residual stocks can have vanadium levels as high as 1000–2000 ppm. Typical residual stocks and their vanadium level include: Sag River atmospheric residuum, 48 ppm vanadium; heavy Iranian atmospheric residuum, 289 ppm vanadium; Canadian tar sand bitumen, 299 ppm vanadium; Tia Juana Vacuum residuum, 570 ppm vanadium; Bachaquero Vacuum residuum, 754 ppm vanadium; and Orinoco Heavy Crude, 1200 ppm vanadium. The higher the metal level in the feed, the more quickly a given catalyst will be poisoned and consequently the more often or more effective the demetallization of that catalyst must be.

Of the various metals which are to be found in representative hydrocarbon feedstocks some, like the alkali metals, only deactivate the catalyst without changing the product distribution; therefore, they might be considered true poisons. Others such as iron, nickel, vanadium and copper markedly alter the selectivity and activity of cracking reactions if allowed to accumulate on the catalyst and, since they affect process performance, are also referred to as "poisons". A poisoned catalyst with these metals generally produces a higher yield of coke and hydrogen at the expense of desired products, such as gasoline and butanes. For instance, U.S. Pat. No. 3,147,228 reports that it has been shown that the yield of butanes, butylenes and gasoline, based on converting 60 volume percent of cracking feed to lighter materials and coke dropped from 58.5 to 49.6 volume percent when the amount of nickel on the catalyst increased from 55 ppm to 645 ppm and the amount of vanadium increased from 145 ppm to 1480 ppm in a fluid catalytic cracking of a feedstock containing some metal contaminated stocks. Since many cracking units are limited by coke burning or gas handling facilities, increased coke or gas yields require a reduction in conversion or throughput to stay within the unit capacity.

An alternative to letting catalyst metals level increase and activity and desired selectivity decrease is to diminish the overall metal content on the catalyst by raising catalyst replacement rates. Either approach, letting metals level increase, or increasing catalyst replacement rates, must be balanced against product value and operating costs to determine the most economic way of operating. The optimum metal level at which to operate any cracking unit will be a function of many factors including feedstock metal content, type and cost of catalyst, overall refinery balance, etc., and can be determined by a comprehensive study of the refinery's operations. With the high cost of both catalyst and the hydrocarbon feedstock today, it is increasingly disadvantageous to discard catalyst or convert hydrocarbon feedstocks to coke or gas.

In contrast to its undesirability as a catalytic poison, vanadium is a desirable metal used in the production of steel, target material for X-rays, catalysts for the polymer industry and catalysts for sulfuric acid production. The U. S. vanadium outlook indicates that by 1980 a production shortage of from a minimum of 7,000 to a maximum of 13,000 tons per year. On the other hand, 7,000 tons per year of vanadium could be produced if all of the vanadium could be recovered from the 100,000 barrels per day of Orinoco crude. Accordingly, crude oils represents a potentially valuable source of vanadium if the vanadium could be recovered.

Some processes for metal removal from catalysts have been disclosed. Anderson, U.S. Pat. No. 3,150,103 discloses a method of removing vanadium from catalyst by contacting a regenerated catalyst with a gas containing molecular oxygen at a temperature of at least about 1150° F., with preferred temperature ranges of from 1350° to 1600° F. In Anderson, U.S. Pat. No. 3,173,882, a regenerated catalyst was subjected to a gas-containing molecular oxygen at a temperature of at least 1000° F., sulfided at from 750 to 1600° F., and then washed with an aqueous mineral acid solvent to remove contaminated metal sulfide. In Erickson, U.S. Pat. No. 3,147,228, nickel was removed by sulfiding a catalyst at 500° to 1500° F. with a gaseous sulfiding agent, contacting with a molecular oxygen-containing gas, and washing with an aqueous medium. Erickson et al, U.S. Pat. No. 3,147,209, disclosed a method for removing nickel from contaminated catalyst by sulfiding at 500° to 1600° F., contacting the sulfided catalyst with a specific mixture of steam and molecular oxygen-containing gas, and washing with an aqueous medium. In Disegna et al, U.S. Pat. No. 3,252,918, a method for removing vanadium included regenerating the catalyst and then contacting with a gas consisting essentially of molecular oxygen in the presence of an oxide of nitrogen at a temperature of 600° to 1300° F.

A commercial catalyst demetallization process is disclosed in an article entitled "DeMet Improves FCC Yields" appearing in *The Oil and Gas Journal* of Aug. 27, 1962, pp. 92-96 and in an article entitled "The Demetallization of Cracking Catalysts" appearing in *I & E C Product Research and Development*, Vol. 2, pp. 328-332, December, 1963. This process while successful in accomplishing its intended purpose with the catalysts described encountered metal corrosion problems in conjunction with the chlorination reactions involved. In addition, this process utilizes a sulfidation pretreatment step which places in excess o 2.0 wt % sulfur on the catalyst. In subsequent steps, this sulfur as it is removed from the catalyst, can be converted to elemental sulfur which, in turn can deposit in the reactor and transfer lines. These deposits can accumulate to excessive levels and lead to plugging of the reactor lines.

SUMMARY OF THE INVENTION

According to the instant invention there is provided an unexpected improvement in the removal of metals from metal contaminated catalysts, particularly, catalysts used to process high metals containing feeds by the utilization of a reductive wash and a subsequent oxidative wash.

Moreover, the instant invention provides a process for removing a portion of one or more metals from a catalyst used in a hydrocarbon conversion process while at the same time maintaining the desired catalyst activity without requiring corrosive processing conditions and/or requiring high sulfur levels during pretreatment portions of the process. In addition, the instant invention can provide a basis for recovering vanadium for subsequent metallurgical use from crude oil or reduced crude oils while simultaneously converting the crude to make valuable hydrocarbon products.

The process of the present invention includes contacting a hydrocarbon conversion catalyst containing catalytically contaminating metals with a sulfur containing compound to convert at least a portion of the poisoning metals to a metal-sulfur-containing compound, contacting the catalyst with a gaseous oxidizing medium, preferably under defined temperature conditions of about 525° to 725° F. to convert at least a part of the metal-sulfur-containing compound to a removable form and subsequently reducing the metal contaminant level on the catalyst such as by washing. The instant invention reduces or eliminates the discard of expensive catalyst, enables the use of low grade, highly metal contaminated feedstocks, and can be used to recover metals from the hydrocarbon feedstock. The process can be adjusted so that a catalyst contaminated with nickel and vanadium may be treated only for nickel or vanadium removal, or the catalyst may be treated for both vanadium and nickel removal.

BRIEF DESCRIPTION OF THE DRAWING

Other objects and advantages of the invention will become apparent upon reading the following detailed description and upon reference to the drawings, in which:

FIG. 2 is a plot of Carbon Producing Factor, (C.P.F.), microactivity and percentage metal removal of nickel, vanadium and iron versus temperature of treatment with oxygen-containing gas.

Figure 1:
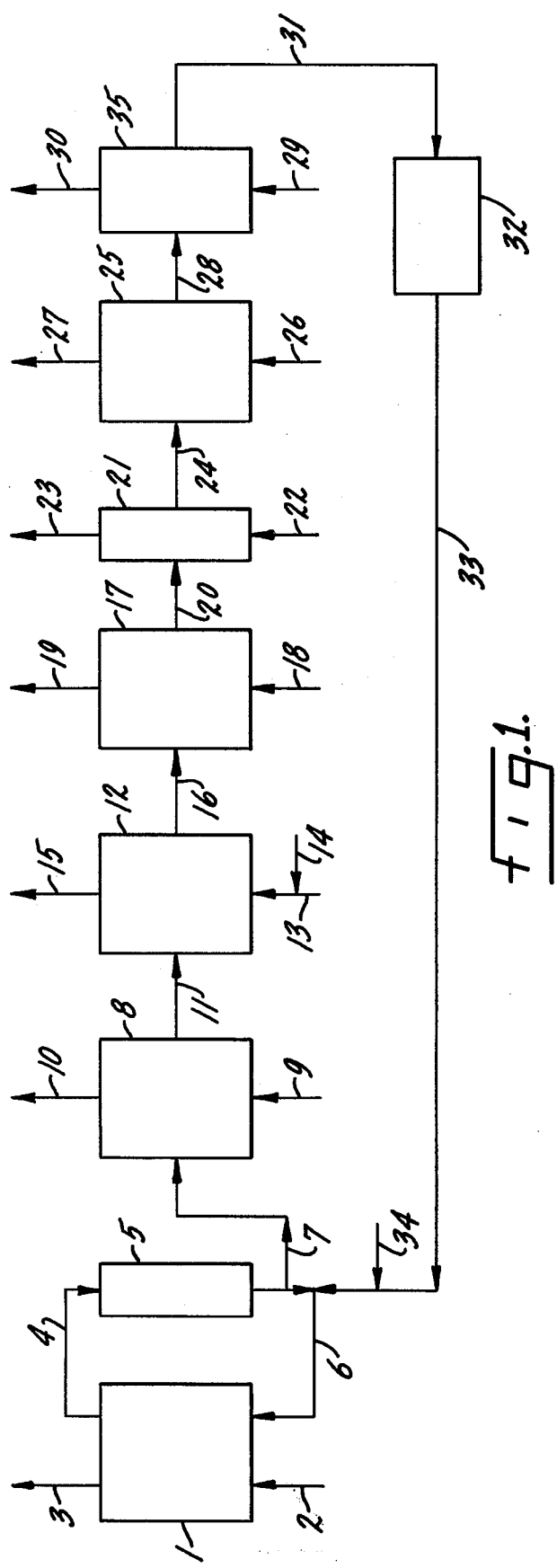
FIG. 1 is a schematic flow diagram illustrating a particularly preferred embodiment of this invention.

While the invention will be described in connection with a preferred procedure (i.e., hydrocarbon cracking), it will be understood that it is not intended to limit the invention to that procedure. On the contrary, it is intended to cover all alternatives, modifications and equivalents as may be included within the spirit and scope of the invention as defined by the appended claims, including other hydrocarbon conversion processes.

DETAILED DESCRIPTION OF THE INVENTION

Commercially used hydrocarbon cracking catalysts are the result of years of study and research into the nature of cracking catalysts. The cost of these catalysts frequently makes highly poisoned hydrocarbon feedstocks, even though they may be in plentiful supply, less desirable to use in cracking operations because of their tendency to deactivate the valuable catalysts. These preferred catalysts, because of their composition, structure, porosity and other characteristics give optimum results in cracking. It is important, therefore, that removing poisoning metals from the catalyst does not substantially adversely affect the desired chemical and physical constitution of the catalyst. Although methods have been suggested in the past for removing poisoning metals from a catalyst which has been used for high temperature hydrocarbon conversions, the process of this invention is particularly effective to remove nickel and/or vanadium and/or iron while substantially maintaining the effectiveness and composition of the catalyst.

Solid oxide catalysts have long been recognized as useful in catalytically promoting the conversion of hydrocarbons. For hydrocarbon cracking processes carried out in the substantial absence of added free molecular hydrogen, suitable catalysts can include amorphous silica alumina catalysts which are usually activated or calcined predominately silica or silica-based, e.g., silica-alumina, silica-magnesia, silica-zirconia, etc., compositions in a state of slight hydration and containing small amounts of acidic oxide promoters in many instances. The oxide catalyst may contain a substantial amount of a gel or gelatinous precipitate comprising a major portion of silica and at least one other inorganic oxide material, such as alumina, zirconia, etc. These oxides may also contain small amounts of other inorganic materials. The use of wholly or partially synthetic gel or gelatinous catalyst, which are uniform and little damaged by high temperatures in treatment and regeneration is often preferable.

Also suitable are hydrocarbon cracking catalysts which include a catalytically effective amount of at least one natural or synthetic zeolite, e.g., crystalline alumino silicate. A preferred catalyst is one that includes at least one zeolite to provide a high activity catalyst. Suitable amounts of zeolite in the catalyst are in the range of about 1-75% by weight. Preferred are zeolite amounts of about 2-30% by weight of the total catalyst. Catalysts which can withstand the conditions of both hydrocarbon cracking and catalyst regeneration are suitable for use in the process of this invention. For example, a phosphate silica-alumina silicate composition is shown in U.S. Pat. No. 3,867,279, chrysotile catalysts are shown in U.S. Pat. No. 3,868,316, and a zeolite beta type of catalyst is shown in U.S. Pat. No. Re. 28,341. The catalyst may be only partially of synthetic material; for example, it may be made by the precipitation of silica-alumina on clay, such as kaolinite or halloysite. One such semisynthetic catalyst contains about equal amounts of silica-alumina gel and clay.

The manufacture of synthetic gel catalyst is conventional, well known in the art and can be performed, for instance (1) by impregnating silica with aluminia salts; (2) by direct combination of precipitated (or gelated) hydrated alumina and silica in appropriate proportions; or (3) by joint precipitation of alumina and silica from an aqueous solution of aluminum and silicon salts. Synthetic catalyst may be produced by a combination of hydrated silica with other hydrate bases as, for instance, zirconia, etc. These synthetic gel-type catalyst may be activated or calcined before use.

A particularly preferred catalyst contains a catalytically effective amount of a decationized zeolitic molecular sieve having less than 90% of the aluminum atoms associated with cations, a crystalline structure capable of internally absorbing benzene and a $SiO_2$ to $Al_2O_3$ molar ratio greater than 3. Such catalysts are illustrated in U.S. Pat. No. 3,236,761, the teachings of which are incorporated by reference herein.

The physical form of the catalyst is not critical to the present invention and may, for example, vary with the type of manipulative process in which it will be used. The catalyst may be used as a fixed bed or in a circulating system. In a fixed-bed process, a single reaction zone or a series of catalytic reaction zones may be used. If a series of reactors are used, one is usually on stream and others are in the process of cleaning, regeneration, etc. In circulating catalyst systems, such as those of the fluid bed or moving bed catalytic processes, catalyst moves through a reaction zone and then through a regeneration zone. In a fluid bed cracking process, gases are used to convey the catalyst and to keep it in the form of a dense turbulent bed which has no definite upper interface between the dense (solid) phase the suspended (gaseous) phase mixture of catalyst and gas. This type of processing requires the catalyst to be in the form of a fine powder, e.g., a major amount by weight of which being in a size range of about 20 to 150 microns. In other processes, e.g., moving bed catalytic cracking system, the catalyst can be in the form of macrosize particles such as spherical beads which are conveyed between the reaction zone and the catalyst regeneration zone. These beads may range in size up to about ½ inch in diameter. When fresh, the minimum size bead is preferably about ⅛. Other physical forms of catalyst such as tablets, extruded pellets, etc. can be used.

In this invention the hydrocarbon petroleum oils utilized as feedstock for a given conversion process may be of any desired type normally utilized in such hydrocarbon conversion operations. The feedstock may contain nickel, iron and/or vanadium as well as other metals. As indicated, the catalyst may be used to promote the desired hydrocarbon conversion by employing at least one fixed bed, moving bed or fluidized bed (dense or dilute phase) of such catalyst. Bottoms from hydrocarbon processes, (i.e., reduced crude and residuum stocks) are particularly highly contaminated with these metals and therefore rapidly poison catalysts used in converting bottoms to more valuable products. For example, a bottom may contain about 100–1500 ppm Ni, about 100–2500 ppm V and about 100–3000 ppm Fe. For typical operations, the catalytic cracking of the hydrocarbon feed would often result in a conversion of about 10 to 80% by volume of the feedstock into lower boiling, more valuable products.

The present invention is particularly suitable for demetallizing catalysts utilized in the catalytic cracking of reduced or topped crude oils to more valuable products such as illustrated in U.S. Pat. Nos. 3,092,568 and 3,164,542. The teachings of which are incorporated by reference herein. Similarly, this invention is applicable to processing shale oils, tar sands oil, coal oils and the like where metal contamination of the processing, e.g., cracking catalyst, can occur.

A catalytic conversion process as described typically includes a regeneration procedure in which the catalyst is contacted periodically with free oxygen-containing gas in order to restore or maintain the activity of the catalyst by removing at least a portion of the carbonaceous deposits from the catalyst which form during hydrocarbon conversion. However, in those processes not having a regeneration step, the catalyst can be subjected to a regenerating step after the removal of the catalyst from the process. It will be understood that "regeneration" involves a carbonaceous material burn-off procedure. Ordinarily, the catalysts are taken from the hydrocarbon conversion system and treated before the poisoning metals have reached an undesirably high level, for instance, above about 0.5% by weight, on catalyst and preferably less than about 10% maximum, content of nickel, iron and vanadium. More preferably, the catalyst is removed when the nickel, iron and vanadium content is less than about 5% by weight and most preferably when the catalyst contains about 0.75% to about 2% by weight nickel, iron and vanadium. Generally speaking, when the hydrocarbon conversion levels, i.e. more than about 50% by volume (of the feedstock) conversion, the amount of metals tolerated on the catalyst is less. On the other hand, low conversion levels, i.e. less than about 50% by volume conversion, tolerate higher amounts of metals on the catalyst. The actual time or extent of the regeneration thus depends on various factors and is dependent on, for example, the extent of metals content in the feed, the level of conversion, unit tolerance for poison, the sensitivity of the particular catalyst toward the demetallization procedure used to remove metals from the catalyst, etc.

Regeneration of a hydrocarbon cracking catalyst to remove carbonaceous deposit material is conventional and well known in the art. For example, in a typical fluidized bed cracking unit, a portion of catalyst is continually being removed from the reactor and sent to the regenerator for contact with an oxygen-containing gas at about 950° to about 1220° F., preferably about 1000° to about 1150° F. Combustion of carbonaceous deposits from the catalyst is rapid, and, for reasons of economy, air is used to supply the needed oxygen. Average residence time a catalyst particle in the regenerator may be on the order of about three to one hundred minutes, preferably about three minutes to sixty minutes and the oxygen content of the effluent gases from the regenerator is desirably less than about 0.5 weight %. When later oxygen treatment is employed, the regeneration of any particular quantity of catalyst is generally regulated to give a carbon content remaining on the catalyst of less than about 0.5 weight %.

The process of this invention includes removing a metal poisoned catalyst which has been in contact with a metal contaminating hydrocarbon feedstock in a conversion, e.g., reaction zone, at elevated temperatures and reducing the metal content of the catalyst by contacting it with a sulfiding agent to convert at least a substantial amount of the poisoning metals to metal-sulfur-containing compounds, contacting the catalyst with a gaseous oxidizing medium, preferably in a defined temperature range and reducing the amount of contaminating metal compounds on the catalyst. The process may be repeated for further reductions in metals.

The conversion of the metals to a metal sulfur containing compound can be performed by contacting the poisoned catalyst with elemental sulfur vapors, or more conveniently by contacting the poisoned catalyst with a volatile sulfide, (including one or more components capable of generating volatile sulfide at the contacting conductors), such as $H_2S$, $CS_2$ or a mercaptan at an elevated temperature generally in the range of about 500° to 1700° F., preferably about 800° to 1400° F., and a sulfiding vapor partial pressure of about 0.5 to 30 atmospheres or more, preferably from about 0.2 to 25 atmospheres. Hydrogen sulfide is the preferred sulfiding agent. Pressures below atmospheric can be obtained either by using a partial vacuum or by diluting the vapor with a gas such as hydrogen or nitrogen. Particularly preferred are mixtures of hydrogen sulfide with hydrogen and/or carbon monoxide and/or carbon dioxide. The time of contact varies on the basis of the temperature and pressure chosen and other factors such as the amount of metal to be removed. Such contacting may run for up to about 20 hours or more, preferably about ¼ to 20 hours depending on these conditions and the severity of the poisoning. Temperatures of from about 900° to 1350° F. and pressures approximately 1 atmosphere or less are preferred. More preferably such contacting continues for at least about 1 to 2 hours but the time, of course can depend upon the manner of contacting the catalyst and sulfur-containing agent and the nature of the contacting system, e.g. batch or continuous, as well as the rate of diffusion within the catalyst matrix.

Preferably the amount of sulfur added to the catalyst is a function of the total metals on the catalyst. For example, it is preferred that the weight % sulfur on the catalyst after contacting with the sulfur-containing agent be about 40-75% of the weight % of the total nickel, vanadium and iron on the catalyst. Studies have shown that catalysts containing about 1.5 to 2.0 weight % of these metals should contain about 1.0 to 1.5% sulfur after this contacting step to ensure effective metals removal in subsequent steps of the process.

The contacting with sulfur-containing agent converts at least a portion of the catalyst metal poisons to sulfur-containing metal compounds and also appears to concentrate some metal poisons, especially nickel, at the surface of the catalyst particle.

It has been discovered that exposure of the catalyst to defined oxidation temperature in the range of 525°-725° F. converts at least a portion of the sulfur-containing metal compounds on the catalyst to a form dispersible or removable by a subsequent washing step. Oxidation is performed by contacting the catalyst containing sulfur-containing metal compounds with free molecular oxygen and/or at least one gaseous oxidizing agent capable of liberating oxygen at conditions to provide at least a portion of the metal poisons, e.g. nickel, vanadium and iron, in a readily removable, dispersible form. For example, some of the sulfur-containing metal compound may be converted to the simple monosulfide or oxygenated sulfur salts. The identity of other soluble or otherwise dispersible forms of the poisoning metals has not been established, but contact with a liquid aqueous medium does remove a substantial portion of the metal poisons. As used herein, "dispersible" is intended to include minute particle size material, as well as soluble and colloidal size particles. In the oxidation step, the temperature is adjusted to an elevated temperature below 750° F., for example from 500° F. to 750° F., preferably from about 550° F. to about 725° F., more preferably, from about 600° F. to about 700° F., and most preferably, from about 620° F. to about 680° F. Gaseous oxygen or mixtures of gaseous oxygen (including gases which are capable of liberating oxygen at the conditions employed) with inert gases such as nitrogen (i.e., air), may be brought into contact with the sulfur-metal containing compound contacting catalyst at an oxygen partial pressure, preferably of about 0.2 atmosphere and upward, for a time dependent on oxygen partial pressure. Preferably this contacting is carried out at less than about one atmosphere of oxygen and for contact times of about 2 minutes to about one hour.

More preferably contact with the gaseous oxidizing agent is carried out for less than about thirty minutes. The oxygen-containing gas used in the treatment contains molecular oxygen as an active ingredient. The gas may be oxygen, or a mixture of inert gas with oxgyen, such as air or oxygen-enriched air. The partial pressure of oxygen in this contacting may vary widely, for example, from about 0.2 to about 30 atmospheres, but usually the total gas pressure will not exceed and preferably will be far below about 20 atmospheres. The factors of time and partial pressure may be chosen with a view to the most economically feasible set of conditions. It is preferred to continue the oxygen treatment for at least about 15 or 30 minutes with a gas containing at least about 1%, preferably at least about 5 – 10% oxygen. As indicated, it is preferred that the oxygen contact should be at a temperature of from 525 to 725° F.

The catalyst temperatures should be first adjusted to below 725° F., preferably between 525° F. to 725° F. and the oxygen-containing gas should be added so as to maintain the temperature in this range. In this regard, when the oxygen containing gas is added, an exothermic reaction occurs. Thus, the tendency is for the temperature to rise. This may be offset by having the oxygen-containing gas at a lower temperature to impart a cooling effect. In addition, the addition rate may be controlled to maintain the desired oxidation temperature. External cooling sources such as heat exchangers positioned in the reaction zone can be used. In any case, when the catalyst is adjusted to from 525° F. to 725° F., the contact with the oxygen containing gas is also maintained at 525° F. to 725° F. Preferably, the catalyst is adjusted to a temperature of from about 550° F. to about 725° F. with the temperature during contact with the oxygen-containing gas maintained at about 550° F. to about 725° F. More preferably, the catalyst is adjusted to from about 600° F. to about 700° F. with the temperature during contact with the oxygen-containing gas maintained at about 600° F. to about 700° F. Most preferably, the catalyst is adjusted to from about 620° F. to about 680° F. with the temperature during contact with the oxygen-containing gas maintained at about 620° F. to about 680° F.

After converting at least a portion of the sulfur-containing metal compound on the catalyst, to a removable form, at least a portion of the metal poison is removed by contacting, e.g., washing, the catalyst with a liquid aqueous medium. For example, the catalyst may be washed with an aqueous solution or an acidic aqueous solution such as an aqueous solution of $HNO_3$, $H_2SO_4$, HCl, and the like. The acidity of the wash solutions, however, and wash times should be selected to insure that excessive amounts of $Al_2O_3$, if present, are not removed from the catalyst. Suitable acidic aqueous solutions are dilute aqueous solutions having a pH in the range of about 2 to 5.

A preferred washing method utilizes a reductive wash, which is preferably followed by an oxidative wash. The washes may be given alternately or several reductive washes may be followed by several oxidative washes. When alternating washes are used, the final wash is preferably an oxidative wash to leave the catalyst in the best form for hydrocarbon conversion, e.g., cracking. As used herein, "reductive" wash refers to a wash with an aqueous solution containing a reducing agent or an agent which may give up electrons. Similarly, "oxidative" wash refers to a wash with an aqueous solution containing an oxidizing agent or an agent which may accept electrons. Moreover, "wash" refers to a treatment with the solution which may be accomplished by contacting the catalyst with the wash solution for a time sufficient to cause an interaction between the solution and catalyst thereby removing at least a portion of the metal poison. The contacting may be a batch operation, a semi-continuous operation or a continuous operation. Thus, a "wash" may include merely stirring in a batch vessel or a complex series of counter current contactors or continuous contactors.

A preferred reductive wash medium comprises a solution of sulfur dioxide or compounds capable of producing sulfur dioxide such as bisulfite and/or sulfite salts in an acidic aqueous medium. Other reducing agents which may be used include hydrogen, carbon monoxide, hydrogen sulfide, oxalic acid or salts thereof, hydrazine and hydrazine derivatives, borane, diborane, borohydrides, metallic aluminum hydrides, sulfites, thiosulfates, dithionites, polythionites and the like. Sulfur dioxide is preferred since it provides sufficient temporary acidity without risking substantial alumina removal, it provides sufficient reducing power and it produces stable anions containing sulfur and oxygen to keep the removed metals in soluble form. Reductive washes with sulfur dioxide are preferably effected at conditions to inhibit oxidation of the $SO_2$, e.g., in the essential absence of added free molecular oxygen. In addition, reductive washes with $SO_2$ provide for improved solubility of elemental sulfur which may have been deposited on the catalyst during contact with the sulfur-containing agent. Such elemental sulfur deposited on the catalyst can act to reduce the degree of demetallization produced from the present process. Therefore, solubilization of such sulfur is an additional benefit of a reductive wash with $SO_2$. By way of example of a preferred reductive wash, an aqueous solution saturated with sulfur dioxide to form a sulfur oxide hydrate (i.e. $SO_2 \cdot xH_2O$) is prepared at about 0°-20° C preferably about 5°-15° C., by bubbling $SO_2$ through water. An aqueous, e.g., about 10–50% and preferably about 15–25% by weight catalyst slurry in water is prepared and heated to a temperature of about 60°-95° C., preferably 65°-80° C. The $SO_2$ saturated solution is then added to the catalyst slurry in an amount sufficient to give an initial pH of the system in the range of about 2.0 to about 3.5 and preferably about 2.5 to 3.0. Preferably, about 0.1 to about 10 volumes of $SO_2$ saturated solution per volume of catalyst are used during the wash. After the contacting has occurred for about 0.5–10 minutes, preferably about 1–5 minutes, preferably under an inert atmosphere, the demetallized catalyst can be separated, e.g., by filtration or decanting. Long contact times, i.e., in excess of about 10 minutes, are preferably avoided to minimize metals redeposition on the catalyst and to avoid oxidation of the $SO_2$ should the wash be effected in a manner where air and oxygen are not intentionally excluded. This reductive wash step can be followed by a water wash.

As indicated, the reductive wash is preferably followed by an oxidative wash. A preferred oxidative wash medium comprises a solution of hydrogen peroxide in water. Other oxidizing agents which may be used include air, oxygen, ozone, perchlorates, organic hydroperoxides, organic peroxides, organic peracids, inorganic peroxyacids such as peroxymonosulfuric and peroxydisulfuric acid, singlet oxygen, $NO_2$, $N_2O_4$, $N_2O_3$, superoxides and the like. Typical examples of organic oxidants are hydroxyheptyl peroxide, cyclohexanone peroxide, tertiary butyl peracetate, di-tertiary butyl diperphthalate, tertiary butyl perbenzoate, methyl ethyl hydroperoxide, di-tertiary butyl peroxide, p-methyl benzene hydroperoxide, pinane hydroperoxide, 2,5-dimethylhexane-2,5-dihydroperoxide, cumene hydroperoxide and the like; as well as organic peracids such as performic acid, peracetic acid, trichloroperacetic acid, perchloric acid, periodic acid, perbenzoic acid, perphthalic acid and the like including salts thereof. Ambient oxidative wash temperatures can be used, but temperatures of about 150° F. to the boiling point of the aqueous solution in combination with agitation are helpful in increasing dispersibility or removability of the metal poisons. Preferred temperatures are about 65° to about 95° C. Pressure above atmospheric may be used but the results usually do not justify the additional equipment. Contact times similar to the contact times for the reductive wash such as from about several seconds to about half an hour are usually sufficient for poisoning metal removal.

As indicated, preferably, the reductive wash is followed by a hydrogen peroxide-water oxidative wash. The hydrogen peroxide solution preferably containing about 2 to 30 weight % hydrogen peroxide, can be added to an aqueous catalyst slurry as described earlier at about 65°–95° C., preferably 60°–85° C. and allowed to react for a time sufficient to solubilize at least a portion of the vanadium. Preferred wash times are about 1–5 minutes. As a result, if contact times are unnecessarily prolonged, this species can decompose and redeposit vanadium on the catalyst. A concentration of $H_2O_2$ in the range of about 5–50 lb., preferably about 10–20 lb. of $H_2O_2$/ton of catalyst is preferably used. Additional oxidative washes can be used to ensure efficient removal of metal and the restoration of catalytic properties. In addition, the oxidative washing can be carried out either in the presence of or absence of a mineral acid such as HCl, $HNO_3$ or $H_2SO_4$. Preferably the pH of the oxidative wash medium is about 2 to about 6. Alternating catalyst washing using reductive and oxidative solutions can be used. If alternative washes are used, it is preferred that the last wash be an oxidative wash.

After the catalyst is washed, the catalyst slurry can be filtered to give a cake. The cake may be reslurried one or more times with water or rinsed in other ways, such as, for example, by a water wash of the filter cake.

After the washing and rinsing treatment which may be used in the catalyst demetallization procedure, the catalyst is transferred to a hydrocarbon conversion system, for instance, to a catalyst regenerator. The catalyst may be returned as a slurry in the final aqueous wash medium, or it may be desirable first to dry the catalyst filter cake or filter cake slurry at, for example, about 215° to 320° F., under a vacuum. Also, prior to reusing the catalyst in the conversion operation it can be calcined, for example, at temperatures usually in the range of about 700° F. to about 1300° F. The catalyst may also be slurried with hdyrocarbons and added back to the reactor vessel, if desired.

A fluidized solids technique is preferred for the vapor contact processes used in any selected demetallization procedure as a way to shorten the time requirements. If desired, additional metals removal may be obtained by repeating the demetallization sequence or using other known treatment processes. Inert gases frequently may be employed after contact with reactive vapors to remove any of these vapors entrained in the catalyst or to purge the catalyst of reaction products.

The catalyst to be treated may be removed from the hydrocarbon conversion system — that is, the stream of catalyst which, in most conventional procedures is cycled between conversion and regenerating operations — before the poison content reaches about 100,000 ppm, the poisoning metals, e.g., nickel, vanadium and iron, being calculated as elemental metals. Generally, at least about 5,000 to about 20,000 ppm. metals will be accumulated on the catalyst before demetallization is warranted. The treatment of this invention is effective despite the presence of a small amount of carbonaceous material on the treated catalyst, but preferably catalyst regeneration is continued until the catalyst contains not more than about 0.5% carbonaceous material.

The amount of nickel, vanadium and/or iron removed in practicing the procedures outlined or the proportions of each may be varied by proper choice of treating conditions. It may prove necessary, in the case of very severly poisoned catalyst, to repeat the treatment to reduce the metals to an acceptable level, perhaps with variations when one metal is greatly in excess. A further significant advantage of the process lies in the fact that the overall metals removal operation even if repeated, does not unduly deleteriously affect the activity, selectivity, pore structure and other desirable characteristics of the catalyst. Any given step in the demetallization treatment is usually continued for a time sufficient to effect a meaningful conversion or removal of poisoning metal and ultimately results in a substantial increase in metals removal compared with that which would have been removed if the particular step had not been performed. Generally, a process with at least one of both a reductive and an oxidative wash will provide greater than about a 50 weight % reduction in nickel, about 20 weight % reduction in vanadium and about 30 weight % reduction in iron. Such processing preferably provides about 70–90 weight % reduction in nickel, about 30–70 weight % reduction in vanadium and about 30–75 weight % reduction in iron when the catalyst initially contains as much as about 0.1 to 0.5 weight % nickel, about 0.3 to 1.0 weight % vanadium and about 0.2 to 1.2 weight % of iron.

In practice, the process of the present invention can be applied by removing a portion of catalyst from the regenerator or regenerator standpipe of a hydrocarbon conversion unit, e.g., cracking system, after a standard regeneration treatment to remove at least a portion of the carbonaceous material from the catalyst, converting the metals to a metal sulfur containing compound, cooling and oxidizing the catalyst, slurrying the catalyst for a reductive wash, filtering, and reslurrying the catalyst for an oxidative wash, filtering and rinsing with water. The treated catalyst can be returned to the unit, for example, to the regenerator or slurried in hydrocarbons to be returned to the reactor. The following examples are illustrative of the invention but should not be considered limiting.

EXAMPLE 1

A Phillips Borger equilibrium silica-alumina zeolite-containing cracking catalyst was treated in accordance with the present invention. This catalyst includes about 5% by weight of crystalline alumina silicate effective to promote hydrocarbon cracking and has an initial catalytic activity as follows:

|  | Catalytic Activity | | |
|---|---|---|---|
|  | MA | CPF | $H_2/CH_4$ |
| Original Catalyst | 80 | 0.75 | 8.0 |

The catalyst as above was used in a fluid catalytic cracking conversion of hydrocarbon feedstock contaminated with iron, nickel and vanadium. The metal contaminated catalyst was removed from the hydrocarbon conversion stream with the following metal content (based on elemental metals).

| Contaminated Catalyst | Nickel | 2500 ppm. |
|---|---|---|
|  | Vanadium | 7500 ppm. |
| and a catalytic activity of: | Iron | 6800 ppm. |

| Catalytic Activity | | |
|---|---|---|
| MA | CPF | $H_2/CH_4$ |
| 59.1 | 3.02 | 20.0 |

The contaminated catalyst was regenerated to remove carbon under normal conditions and had less than 0.5% by weight of carbon. The catalyst was then heated to 1350° F. with an accompanying nitrogen purge. Hydrogen sulfide was then added at about 2¾ weight % of catalyst/min. A slight exotherm of 10°–15° F. was noticed when hydrogen sulfide with $N_2$ as a diluent (100-20:0-80 $H_2S$ to $N_2$ ratio) was first introduced to catalyst. The hydrogen sulfide was held contant for four hours at a temperature of 1350° F. At the end of the fourth hour the addition of hydrogen sulfide was terminated and the catalyst allowed to cool under nitrogen flow to approximately 500° F. Sulfur level on the sulfided catalyst at this point was between 1.0 and 1.3%.

After the catalyst had cooled to approximately 500° F. following sulfidation, it was heated to a stable temperature of 600° F. under nitrogen flow. After the temperature had stabilized, nitrogen was turned off and air was introduced to the catalyst at a rate of 8.0 l/min/Kgm. of catalyst. An exotherm took place causing the temperature to rise from 600° F. to between 630° F. and 680° F. The extent of the exotherm will vary depending upon amount and type of sulfur left on catalyst after sulfidation step. Oxidation with air was run for a total reaction time of about 25 minutes. The catalyst was cooled under a nitrogen flow of about 3 l/min./Kgm. Catalyst was transferred to a holding vessel when it had cooled to 250° F. Sulfur level on the catalyst at this stage was between 0.7 and 0.9%.

The catalyst was slurried with water to give about a 20 weight % solids slurry and sufficient sulfur dioxide was added to give an initial pH of 2.0. The temperature was maintained at about 70° C. for about three minutes. The catalyst was then filtered and the aqueous sulfur dioxide wash was repeated twice more to give a total of three reductive washes.

The catalyst wash then slurried with water to give about a 20% solids slurry and hydrogen peroxide at the rate of 10–20 lb./ton of catalyst was added. The pH was initially about 2.8–3.3 and the temperature was about 80° C. Again the wash was carried out for three minutes and the hydrogen peroxide wash was repeated once more to give a total of two oxidative washes. The catalyst was washed with water forming a 20% slurry twice, filtered and then dried under vacuum at about 100°–160° C.

Measurements of percent metal removal and catalytic activity were then taken and the results are as follows:

| Metal Removal % | | | Catalytic Activity | | |
|---|---|---|---|---|---|
| Ni | Fe | V | MA | CPF | $H_2/CH_4$ |
| 82 | 40 | 45 | 75.6 | 1.24 | 8.60 |

EXAMPLES II to XIV

Table 1 shows the results of a series of vapor phase oxidative reactions involving a catalyst contaminated with vanadium, nickel and iron using procedures similar to Example I to illustrate the effect of oxidative temperature.

TABLE 1

EFFECT OF OXIDATION TEMPERATURE OF SULFIDED CATALYST ON DEMETALLIZATION AND CATALYTIC OF TREATED CATALYST

Sulfiding Conditions: 1350° F., 4 hours, $H_2S/N_2$

| Example | Oxidation Conditions | | | Metal Removal % | | | | Catalytic Activity | | |
|---|---|---|---|---|---|---|---|---|---|---|
|  | Temp. ° F. | Time Min. | Oxidant | Ni | Fe | V | S | MA | CPF | $H_2/CH_4$ |
| 2 | 900 | 20 | Air | 57 | 19 | 29 | 94 | 65.7 | 3.26 | 23.39 |
| 3 | 800/840 | 25 | Air+Steam | 71 | 33 | 31 |  |  |  |  |
| 4 | 750/830 | 25 | Air | 75 | 41 | 35 | 91 |  |  |  |
| 5 | 700 | 90 | Air+Steam | 79 | 52 | 41 | 83 | 71.2 | 1.48 | 7.41 |
| 6 | 661/717 |  | Air | 82 | 45 | 40 | 85 | 75.6 | 1.24 | 8.60 |
| 7 | 650/720 |  | Air+Steam | 71 | 52 | 50 | 91 | 74.8 | 1.24 | 9.21 |
| 8 | 650 |  | Air+Steam | 86 | 49 | 38 | 83 | 74.4 | 1.25 | 7.24 |
| 9[a] | 613/680 |  | Air | 86 | 56 | 41 |  | 73.1 | 0.91 | 10.9 |
| 10[a] | 608/682 |  | Air | 86 | 57 | 43 |  | 73.4 | 1.19 | — |
| 11 | 600/650 | 30 | Air+Steam | 86 | 56 | 60 | 90 |  |  |  |
| 12 | 559/588 | 25 | Air | 89 | 57 | 31 |  | 74.0 | 1.66 | 6.28 |
| 13[b] | 595 |  | Air |  |  |  |  | 64.5 | 2.40 | 13.49 |
| 14 | 400 | 180 | Air | 50 | 31 | 8 | 72 |  |  |  |

[a]Sulfided with hydrogen sulfide and hydrogen mixture, $H_2S:H_2=80:20$.
[b]Estimated catalytic activity.
[c]The first temperature is the initial temperature to which the catalyst and oxidizing mixture is adjusted; the second temperature is the highest point of the exotherm if it was measured.

FIG. 1 shows a plot of the percent metal removal for nickel, iron and vanadium along with the catalytic activity as MA, CPF and $H_2/CH_4$ as a function of the temperature of treatment with oxygen. The peaks of the various curves vary and do not all occur at the same temperature but the peaks do occur in the defined temperature range of 525°–725° F.

For example, the iron removal seems to peak at about 600° F. while the vanadium seems to peak at about 685° F. and the nickel removal peaks at about 635° F. The microactivity (MA) peaks at about 625° F., the carbon producing factor (CPF) peaks at about 650° F., and the $H_2/CH_4$ ratio peaks at about 715° F.

DESCRIPTION OF PREFERRED PROCESS FLOW

Referring to FIG. 1, there is illustrated a preferred process flow according to the teachings of the present invention. A metals contaminated hydrocarbon feedstock containing large amounts of poisoning metals such as iron, nickel and vanadium enters a conventional fluid bed, catalytic cracking unit 1 via line 2. Within fluid catalytic cracking unit 1, the hydrocarbon feedstock is contacted at hydrocarbon cracking conditions with a fluid hydrocarbon cracking catalyst entering via line 6. The resultant converted hydrocarbon products are removed from line 3 for further processing. For example, when the feedstock entering line 2 is a reduced crude or residuum stock, the product removed via line 3 is frequently subjected to additional hydrocarbon conversion reactions to produce more valuable products, e.g., gasoline. Alternatively, hydrocarbon feedstock entering line 2 can be a gas oil stock, a substantial portion which is converted directly to lower boiling products, e.g., gasoline, in catalytic cracking unit 1.

After the completion of the hydrocarbon cracking reaction, the catalyst is removed by a line 4 and passed to regeneration zone 5 wherein carbonaceous material deposited on the catalyst during the course of the hydrocarbon cracking reaction is removed by contact with oxygen at elevated temperatures. The majority of the regenerated catalyst is then removed from regeneration zone 5 by a line 6 and returned to fluid catalytic cracking unit 1 for further in the hydrocarbon cracking reaction. At least a portion of the regenerated catalyst, e.g. less than about 40%, preferably less than about 20% and more preferably about 0.1 to 10% by weight of the total catalyst inventory per day, is removed from line 7 for treatment in accordance with the present invention to remove contaminating metals from the catalyst and to produce a catalyst of increased catalytic activity relative to the regenerated catalyst. The catalyst is first sulfided in sulfiding zone 8 by contact with a gaseous hydrogen sulfide stream 9. Spent gases from the sulfidation reaction are removed from sulfidation reaction zone 8 via line 10 and the resultant sulfided catalyst is removed via line 11 and passed to vapor phase oxidation zone 12. Within vapor phase oxidation zone 12, the catalyst is contacted with a gaseous stream containing oxygen entering line 13 at a temperature within the range of 525° F. to 725° F. to convert the poisoning metals present on the catalyst to a dispersible form. Small amounts of steam entering line 14 can be added to stream 13. The resultant off gases are removed from line 15 for further treatment.

After suitable cooling, the catalyst is removed from oxidation zone 12 via line 16 and passed to reductive wash zone 17 wherein the catalyst is contacted with a saturated aqueous $SO_2$ solution, which enters reduction wash zone 17 via line 18 at a temperature of about 65°–80° C. for about 1–2 minutes. This wash step removes a portion of the poisoning metals from the catalyst. The spent wash is removed from reductive wash zone 17 via line 19 for further treatment and recovery of valuable vanadium.

The resultant reductively washed catalyst is then removed from reductive wash zone 17 via line 20 and passed to water wash zone 21 wherein the catalyst is contacted with an aqueous wash solution entering via line 22. This wash removes chemosorbed $SO_2$ which can decompose the $H_2O_2$ in the subsequent oxidation wash zone if it is not removed. The resultant spent wash solution is removed via line 23 for further treatment in accordance with applicable pollution control standards. The thus water washed catalyst is then passed via line 24 to oxidation wash zone 25 wherein the catalyst is contacted with an aqueous hydrogen peroxide solution entering line 26. This oxidation wash removes additional amounts of contaminating metals from the catalyst and produces a spent wash solution which is removed via line 27 and is subsequently treated to recover valuable metal components such as vanadium. The oxidatively washed catalyst is then removed from oxidation wash zone 25 via line 28 and passed to a second water wash zone 35 wherein the catalyst is optionally washed with a water stream entering line 29. The spent water wash stream is removed from water wash zone 35 via line 30 for subsequent treatment. The water washed catalyst is then passed via line 31 to calcination zone 32 wherein the catalyst is dried prior to its being returned to catalyst cracking unit 1 via line 33. If desired, additional makeup catalyst can be added to the overall process flow via line 34.

We claim as our invention:

1. A process for treating a metal contaminated catalyst which has been poisoned in a hydrocarbon conversion process by a feedstock containing metal poison to remove at least a portion of the metal contaminants and to produce a catalyst with improved catalytic activity which comprises contacting at least a portion of said metal contaminated catalyst with at least one sulfur containing compound to provide a catalyst containing sulfur containing metal compounds;

contacting said catalyst containing sulfur containing metal compounds with an oxygen-containing gas at a temperature maintained within the range of from 550° F. to 725° F. for a time sufficient to promote subsequent metals removal by converting at least a portion of said catalyst metals to a dispersible form;

removing at least a portion of the metal poisons from the oxygen treated catalyst by contacting said oxygen treated catalyst with a reductive wash medium; and recovering a catalyst of reduced metal poison content and improved catalyst activity.

2. A process as in claim 1 wherein the oxygen containing gas is contacted with the sulfided catalyst within the temperature range of from about 600° F. to about 700° F.

3. A process as in claim 1 wherein the oxygen containing gas is contacted with the sulfided catalyst within the temperature range of from about 620° F. to about 680° F.

4. A process as in claim 1 which includes the presence of steam during said oxygen contact step.

5. A process as in claim 1 which comprises alternate reductive and oxidative washes, the last wash comprising an oxidative wash.

6. A process as in claim 1 wherein the reductive wash medium is an aqueous reductive wash medium.

7. A process as in claim 6 wherein the reductive, aqueous wash medium is a solution of $SO_2$ in water.

8. A process as in claim 6 wherein the solution is a saturated $SO_2$ solution.

9. A process as in claim 8 wherein said reductive wash includes a temperature of about 65°–80° C. and a contact time of about 0.5–10 minutes.

10. A process as in claim 9 where said contact time is about 1–5 minutes.

11. A process as in claim 6 wherein the reductively washed catalyst is subjected to an aqueous oxidative wash.

12. A process as in claim 9 wherein the reductively washed catalyst is subjected to an oxidative wash and the oxidative wash medium is an aqueous solution of hydrogen peroxide.

13. A process as in claim 12 wherein said oxidative wash includes a temperature of about 70°–85° C. and a contact time of about 3–5 minutes.

14. A process as in claim 13 wherein said aqueous hydrogen peroxide comprises about 2 to 30 weight % hydrogen peroxide.

15. A process as in claim 1 wherein the contaminated catalyst comprises a zeolite molecular sieve.

16. A process as in claim 15 wherein said zeolitic molecular sieve comprises a decationized zeolitic molecular sieve having less than 90% of the aluminum atoms associated with cations, a crystalline structure capable of internally absorbing benzene and a $SiO_2$ to $Al_2O_3$ molar ratio greater than 3.

* * * * *